US008781748B2

(12) United States Patent
Loddoch et al.

(10) Patent No.: US 8,781,748 B2
(45) Date of Patent: Jul. 15, 2014

(54) SYSTEM AND METHOD FOR GENERATING IMAGES OF SUBSURFACE STRUCTURES

(75) Inventors: Alexander Loddoch, Houston, TX (US); Wei Liu, San Ramon, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 369 days.

(21) Appl. No.: 13/228,667

(22) Filed: Sep. 9, 2011

(65) Prior Publication Data
US 2012/0072117 A1    Mar. 22, 2012

Related U.S. Application Data

(60) Provisional application No. 61/384,596, filed on Sep. 20, 2010.

(51) Int. Cl.
G01V 1/30 (2006.01)
(52) U.S. Cl.
CPC .................... G01V 1/301 (2013.01)
USPC ......................................................... 702/16
(58) Field of Classification Search
CPC ..................................................... G01V 1/301
USPC .......................................................... 702/16
See application file for complete search history.

(56) References Cited

U.S. PATENT DOCUMENTS

| 7,095,678 | B2 | 8/2006 | Winbow et al. |
| 8,332,156 | B2* | 12/2012 | Liu et al. ............... 702/14 |
| 2010/0114494 | A1 | 5/2010 | Higginbotham et al. |
| 2011/0317519 | A1* | 12/2011 | Liu ............................. 367/50 |

FOREIGN PATENT DOCUMENTS

WO    WO 2007-145694    12/2007

OTHER PUBLICATIONS

SEG Las Vegas 2008 Annual Meeting, and Symes, William W. Reverse Time Migration with Optimal Checkpointing, Geophysics, 72, No. 5, SM213-SM221, 2007.
PCT International Preliminary Report on Patentability, International Application No. PCT/US2011/051022 dated Apr. 4, 2013.

* cited by examiner

Primary Examiner — Bryan Bui
(74) Attorney, Agent, or Firm — Marie L. Clapp

(57) ABSTRACT

A system and method for generating images of a subsurface region of interest is provided. In one embodiment, a computer-implemented method of generating images related to a subsurface region of interest includes: accessing, via a central processing unit (CPU), seismic data and an earth model related to the subsurface region of interest; forward propagating a source wavefield using the earth model at a first time interval via at least one external co-processor coupled to the CPU; transferring, at a second time interval, the forward propagated source wavefield to the CPU for compression and external storage; backward propagating the seismic data at the first time interval via the external co-processor to derive backward propagated receiver wavefield; and transferring, at the second time interval, the backward propagated receiver wavefield to the CPU. Via the CPU, the method further includes retrieving the stored forward propagated source wavefield; decompressing the retrieved forward propagated source wavefield; and applying imaging conditions to the decompressed forward propagated source wavefield and backward propagated receiver wavefield to construct image data representative of the subsurface region of interest.

18 Claims, 5 Drawing Sheets

SYSTEM AND METHOD FOR GENERATING IMAGES OF SUBSURFACE STRUCTURES

This Application is based upon and claims the benefit of U.S. Provisional Application 61/384,596 filed Sep. 20, 2010, the entire contents of which are incorporated herein by reference.

TECHNICAL FIELD

The present invention relates generally to a system and method for generating images representative of subsurface structures, and more specifically to an improved system and method for performing reverse time migration of seismic wavefield data to determine subsurface characteristics of subsurface regions of interest.

BACKGROUND OF THE INVENTION

Conventional migration and inversion methods involve the correlation of forward and backward propagated wavefields to obtain images representative of subsurface characteristics. Examples of such methods include reverse-time migration, differential semblance velocity analysis and waveform inversion. These methods require that forward propagated wavefields be accessed in reverse order, in lockstep with the adjoint backward propagated wavefields at each time step.

With respect to reverse time migration, for example, the requirement of simultaneous availability of both the forward and backward propagated wavefields at each time step poses significant computational challenges for large datasets. These challenges are in part due to the need to access the forward propagating wavefield in reverse order, while accessing the backward propagating wavefield in reverse order to correlate with the forward propagating wavefield. Conventional solutions to address the computational challenges strategy include repeated forward propagation of the wavefield to the n-th time step, minimizing the re-computation ratio by optimal wavefield storage strategies and interpolation, backward propagating the already forward propagated source wavefield. See for example Eric Dussaud, et al, Computational strategies for reverse-time migration, SEG Las Vegas 2008 Annual Meeting, and Symes, William W. Reverse Time Migration with Optimal Checkpointing, Geophysics, 72, no. 5, SM213-SM221, 2007.

The RTM algorithm as implemented in the present work addresses this requirement by storing and subsequently retrieving the forward wavefield. The amount of data and particularly the rate at which this data is produced (and needs to be stored/retrieved) makes the use of data compression techniques necessary. Appropriate data compression schemes impose an additional computational burden, therefore reducing the performance of the overall application. By moving the core computational workload of the RTM application to the co-processor, CPU resources are made available for compression/decompression, applying imaging conditions and disk I/O, making this scheme computationally efficient and overall viable.

Conventional approaches to these limitations, particularly on accelerator platforms, often tradeoff the computation, and/ or re-computation, of wavefields, and the storage of the recorded wavefield data in the memory hierarchy, including RAM, local hard drives and network-attached storage. This tradeoff is a function of both hardware and algorithmic considerations. The introduction of re-computation in lieu of (slow) storage is overall a favorable approach on platforms that excel in computational speed, i.e. on accelerators such as GPUs and FPGAs. However, any additional computation does have a negative impact on the overall performance of the application. The optimal implementation would therefore eliminate the performance limitation of wavefield storage & retrieval without increasing the computational load.

Adjoint state problems, such as reverse-time migration, pose serious computational problems for large datasets and manifest themselves in the classical tradeoff between computation and storage. Algorithms realizing a particular tradeoff will have their computational performance limited by the particular tradeoff. For example, storage may be a limiting factor in many algorithms and hardware storage access rate may become the de facto computational rate for a given application. Other algorithms may be designed to balance the computation versus storage tradeoff in such a way that the computational and storage capacities of the system are optimally stressed. For best performance, algorithms should be adaptively designed to optimally use the computational and memory structure of a given new hardware, such as graphics processing units (GPU) or field-programmable gate arrays (FPGA).

As such, a need exists to more efficiently process seismic wavefield data to generate images of a subsurface region of interest in a more timely and cost efficient manner. In particular, the rate at which the required computational operations are carried out needs to be improved beyond. At the same time, the auxiliary components of the method (data storage/ retrieval, data transfer between components involved) need to be optimized and improved accordingly to avoid the creation of bottlenecks that would limit the overall effectiveness of the application.

SUMMARY OF THE INVENTION

The present invention provides a system and method for generating images of subsurface structures that improves computational speed while minimizing computing memory and wavefield data storage requirements. Furthermore, by utilizing co-processor resources the proposed method allows the implementation of additional geophysical features that improve the quality of the resulting subsurface image without increasing the time frame required to carry out the computation. It provides a significant improvement of the price-performance ratio compared to conventional, non-accelerated methods.

In accordance with one non-limiting aspect of the present invention, a system for generating images related to a subsurface region of interest includes a data storage device having seismic data and an earth model related to the subsurface region of interest, a central processing unit (CPU) in communication with the data storage device, the CPU having at least one processing core and associated CPU memory, and at least one external co-processor in communication with the CPU, the external co-processor having at least one external co-processor processing core directly coupled to a corresponding local memory. The external co-processor processing core includes computer programmable code for forward propagating a source wavefield using the earth model at a first time interval; transferring, at a second time interval, the forward propagated source wavefield to the CPU for compression and external storage; backward propagating the seismic data at the first time interval to derive backward propagated receiver wavefield; and transferring, at the second time interval, the backward propagated receiver wavefield to the CPU. The CPU processing core is further programmed to retrieve and decompress the forward propagated source wavefield data and apply imaging conditions, for example in the form of point wise convolution, to the decompressed forward-propagated source wavefield and the backward propagated receiver wavefield to construct image data representative of the subsurface region of interest In accordance with another non-limiting aspect of the present invention, a computer-implemented method for images related to a subsurface region of interest includes code to perform the propagation of seismic wavefields using Finite Difference modeling on co-processors, an asynchronous communication scheme between main computer system and co-processors and a parallel program structure that realizes a 2-pass input/output bound implementation of the Reverse Time Migration algorithm. In one embodiment, the method includes: accessing, via a central processing unit (CPU), seismic data and an earth model related to the subsurface region of interest; forward propagating a source wavefield using the earth model at a first time interval via at least one external co-processor coupled to the CPU; transferring, at a second time interval, the forward propagated source wavefield to the CPU for compression and external storage; backward propagating the seismic data at the first time interval via the external co-processor to derive backward propagated receiver wavefield; and transferring, at the second time interval, the backward propagated receiver wavefield to the CPU. The method further includes, via the CPU: retrieving the stored forward propagated source wavefield; decompressing the retrieved forward propagated source wavefield via the CPU; and applying imaging conditions to the decompressed forward propagated source wavefield and backward propagated receiver wavefield to construct image data representative of the subsurface region of interest.

In another aspect of the invention, a method for propagating seismic wavefields, includes: initiating, via a central processing unit (CPU), a plurality of computational blocks in at least one external co-processor coupled to the CPU for coordinating computational functions related to the wavefield in the external co-processor; initiating, via a central processing unit (CPU), a plurality of data transfer blocks in the external co-processor to coordinate data transfer functions related to the wavefield between the CPU and external co-processor; controlling the propagating of the wavefield via a central processing unit (CPU) via a CPU subthread; and concurrently performing, asynchronously, the computational and data transfer functions via corresponding streams without interfering with the CPU subthread.

The method may further include the step of combining at least two numerical operators in a single computational kernel to be executed by the external co-processor, and may include finite difference modeling to perform the wave propagation.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural references unless the context clearly dictates otherwise.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

Figure 1:
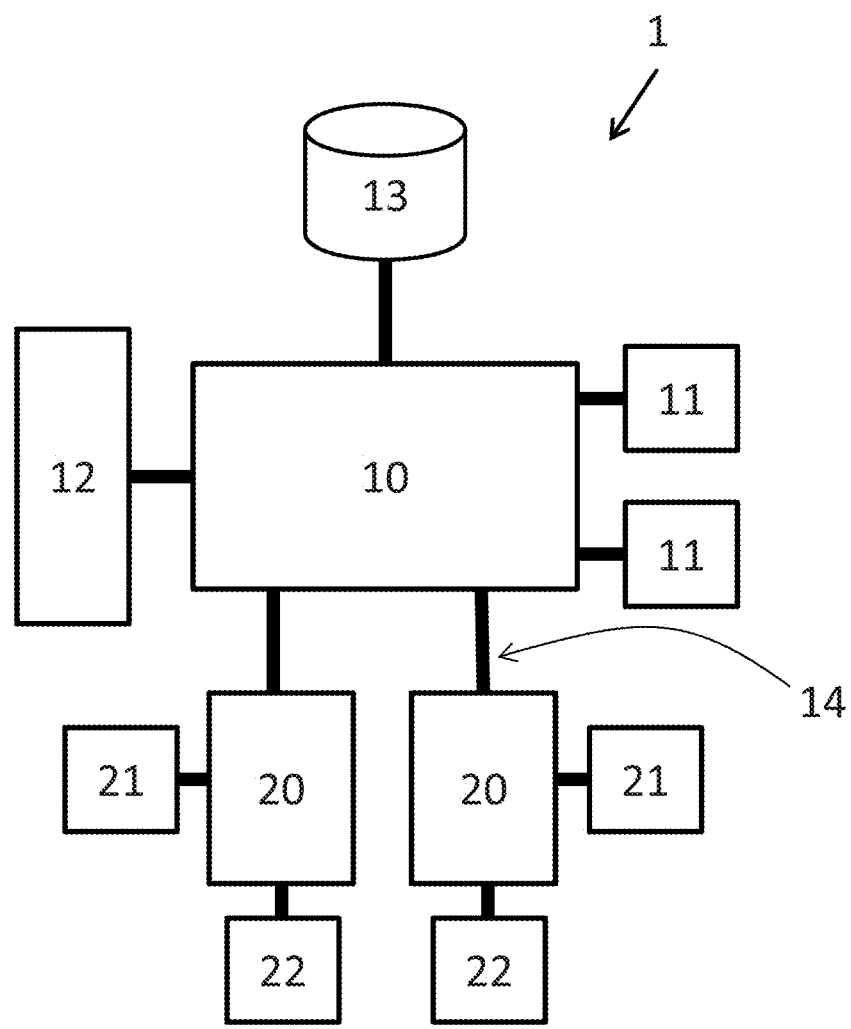
FIG. 1 illustrates one example of a system for implementing embodiments of the present invention.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multi-processor computer processors system, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

FIG. 1 shows an exemplary system 1 for generating images of subsurface structures in accordance with the present invention. It shows the main "host" computer system 10 and one or multiple central processing units (CPUs) 11, (two units shown), a main memory (e.g., RAM) 12, as well as disk storage device 13. Attached via a suitable interface 14 to the main computer system 10 are one or multiple co-processor devices 20 (two shown) each with its own processing unit 21 and memory 22. Several of these systems 1 can be connected and clustered via a computer network interface.

Figure 2:
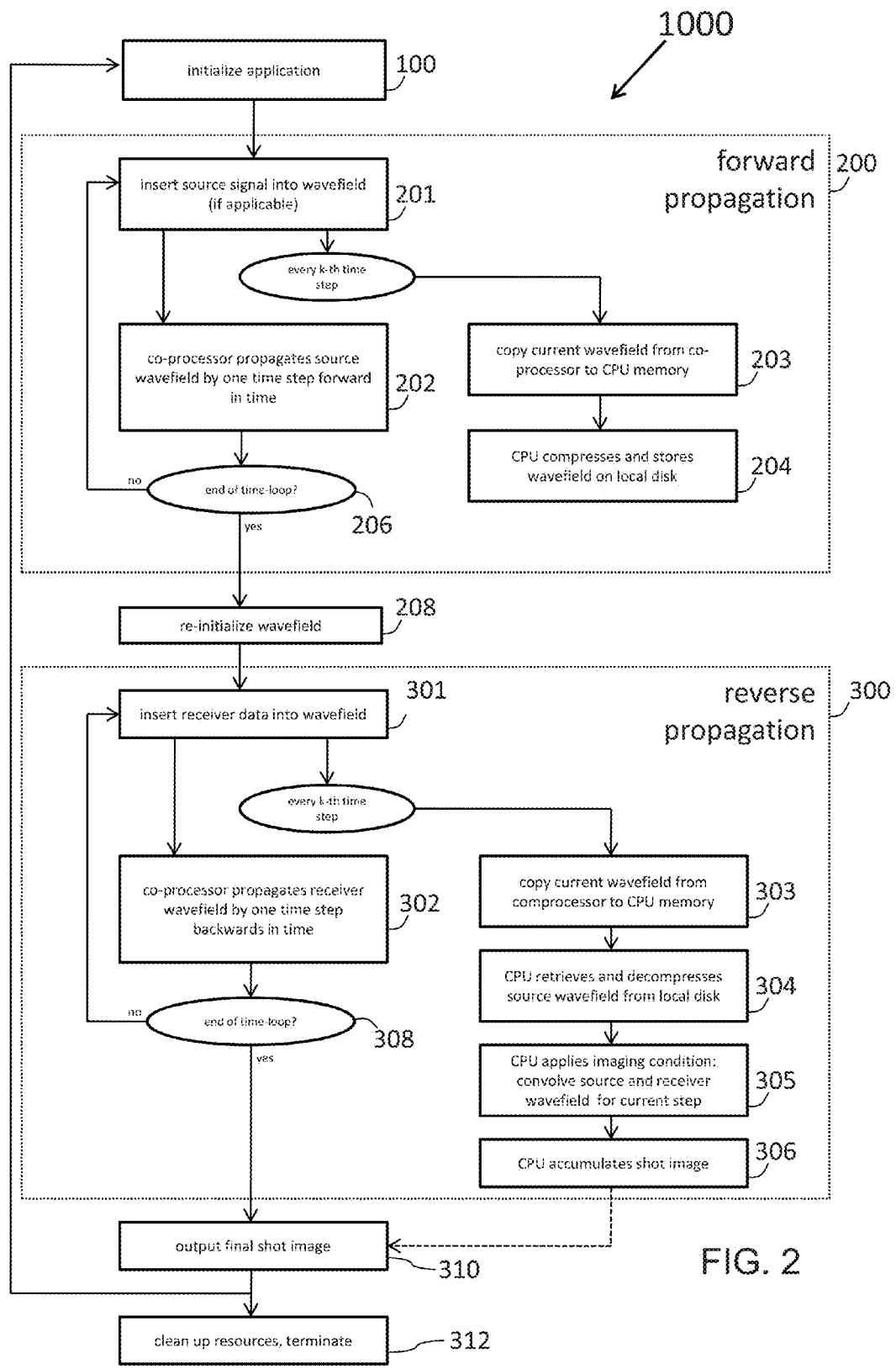
FIG. 2 illustrates one embodiment of the present invention which includes a computer-implemented method of generating images related to a subsurface region.

FIG. 2 illustrates a computer implemented method 1000 of the present invention by means of a flow chart. The flow chart describes the steps involved in creating a subsurface image using the method of the present invention, which may be performed by a system such as the one shown in FIG. 1. The workflow 1000 begins with an initialization step 100 during which the required data is retrieved from storage and compute and memory resources are initialized. The workflow 1000 includes two functional blocks, the forward propagation of a source signal 200 and the reverse propagation of the receiver data 300. Each of these functional blocks is implemented as a loop over a number of time steps, which is specified as a parameter to the application. As the forward part propagates the source signal, the latter needs to be inserted into the source wavefield 201. The source-wavefield is then propagated forward in time by one time step 202, wherein this step is performed by the co-processor. For every k-th step of the time loop (k being a user-specified number, typically between 5 and 10), the current wavefield is transferred from the co-processor into the CPU's memory 203 where it is compressed by the CPU and subsequently written to disk 204. Note that steps 203 and 204 are performed concurrently with the propagation of the source signal 202—up to k subsequent propagation steps can be performed while the data is transferred, compressed and written.

At the end of the forward time loop 206, the wavefield is re-initialized 208 as the same compute resources (CPU and co-processor) are used for forward and reverse propagation. Subsequently, the reverse propagation 300 commences. During each step of the reverse time loop 308 the receiver data (seismic data) is inserted into the wavefield 301, which is then propagated backwards in time by one time step 302 in the same way as during the forward propagation. As in the forward propagation, additional operations 303-306 are carried out for each k-th time step, again, concurrently with propagation. In the case of the reverse propagation, these operations are the transfer on the receiver wavefield from co-processor to CPU memory 303, the retrieval and decompression of the corresponding wavefield snapshot from disk 304, the application of the imaging condition 305, and accumulation of shot images 306. During step 305, the retrieved source wavefield for the current step and the receiver wavefield for the current step are convolved in an appropriate manner and then accumulated into a shot image 306.

At the end of the reverse propagation loop 308, all resources are freed and the final shot image is written to disk 310. After this, the application either cleans up used resources and terminates 321, or returns to the initialization step 100 to process the next shot.

Figure 3:
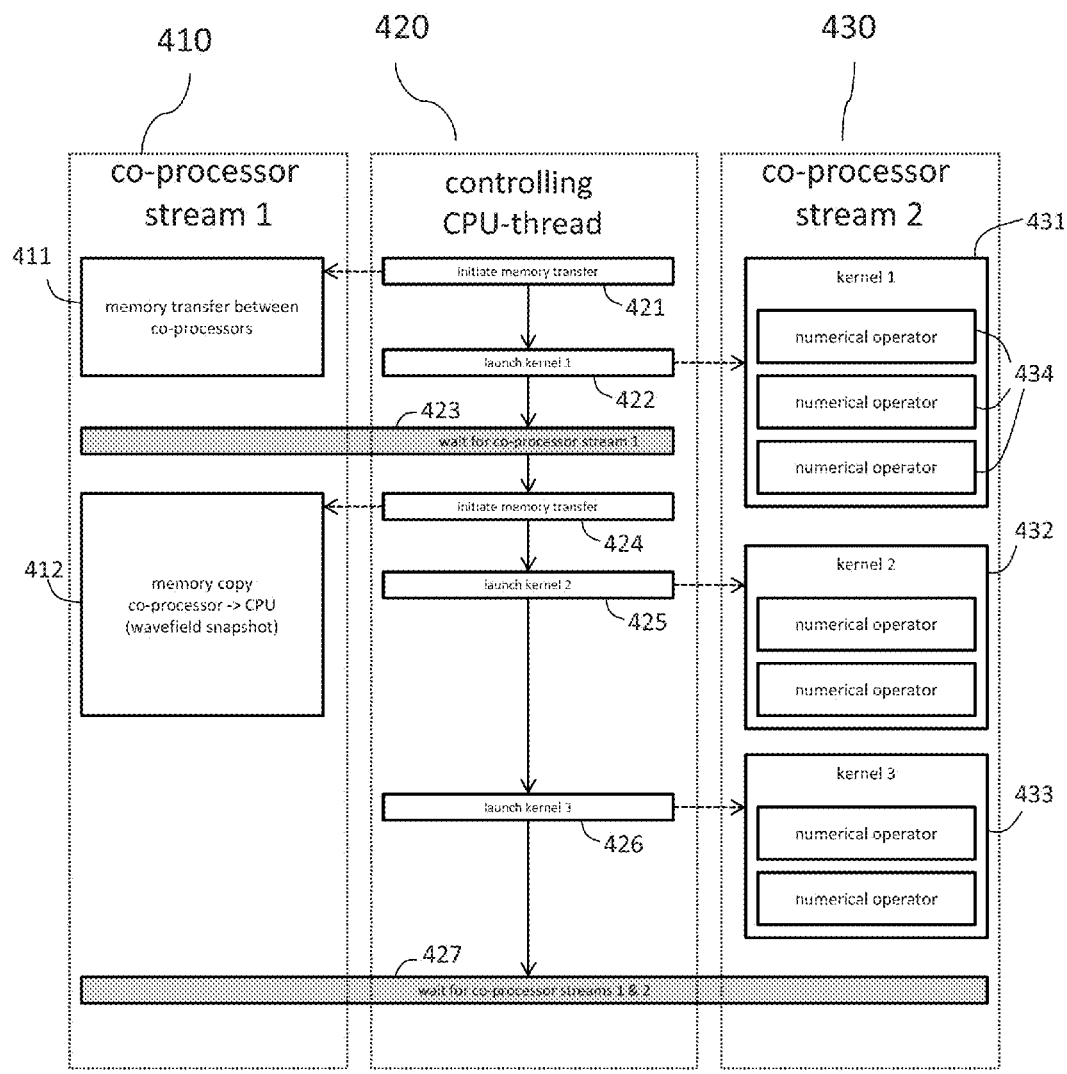
FIG. 3 illustrates an exemplary parallel programming model of the computer-implemented method.

The propagation of the source signal forward in time 202 and the propagation of the receiver data backwards in time 302 are performed using one or multiple co-processors 20 (as shown in FIG. 1). This is achieved by executing the operations on the co-processor as illustrated in FIG. 3. The CPU (for example CPU 11 in FIG. 1) initiates and controls all operations carried out by the co-processor 20, step 420. These operations include memory transfers and 411 and 412, and computational operations 431, 432 and 433 and are grouped into two separate streams of operation, co-processor streams 410 and 420, which can be performed simultaneously. For each forward propagation 202 and reverse propagation 302 the following steps are performed in order: if more than one co-processor 20 is being used, the CPU 11 initiates a memory transfer 421 between co-processors; subsequently, the CPU 11 instructs the co-processor to execute the first kernel 422 containing a first set of numerical operators that in combination represent the propagation of the wavefield. Some or all of the numerical operators, for example as shown in kernels 431, 432 and 433 in FIG. 3, can be combined into a single computational kernel to optimize the use of co-processor resources and to enhance the overall efficiency of this scheme. The combination of such the numerical operators may depend, for example, on the overlap of data used and mathematical operations to be performed.

In accordance with the present invention, the two steps 421 and 422 are performed such that the actual memory transfer 411 and the execution of the kernel 431 occur simultaneously. The CPU then pauses 423 and waits for the memory transfer 411 has completed. If a transfer of the wavefield to CPU memory 203 is required for this particular time step, this memory transfer is initiated by the CPU in accordance with step 424. Afterwards, the CPU launches two more kernels 425 and 426, containing the remaining computational operations that complete the propagation of the wavefield 202. Once again, the execution of the computational operations 432 and 433 occurs simultaneously with the memory transfer from co-processor 20 memory to CPU 11 memory in accordance with step 412. The CPU then waits, step 427, for the completion of all outstanding operations in both co-processor streams 410 and 430, after which the propagation of the wavefield for this time step is completed.

Figure 4:
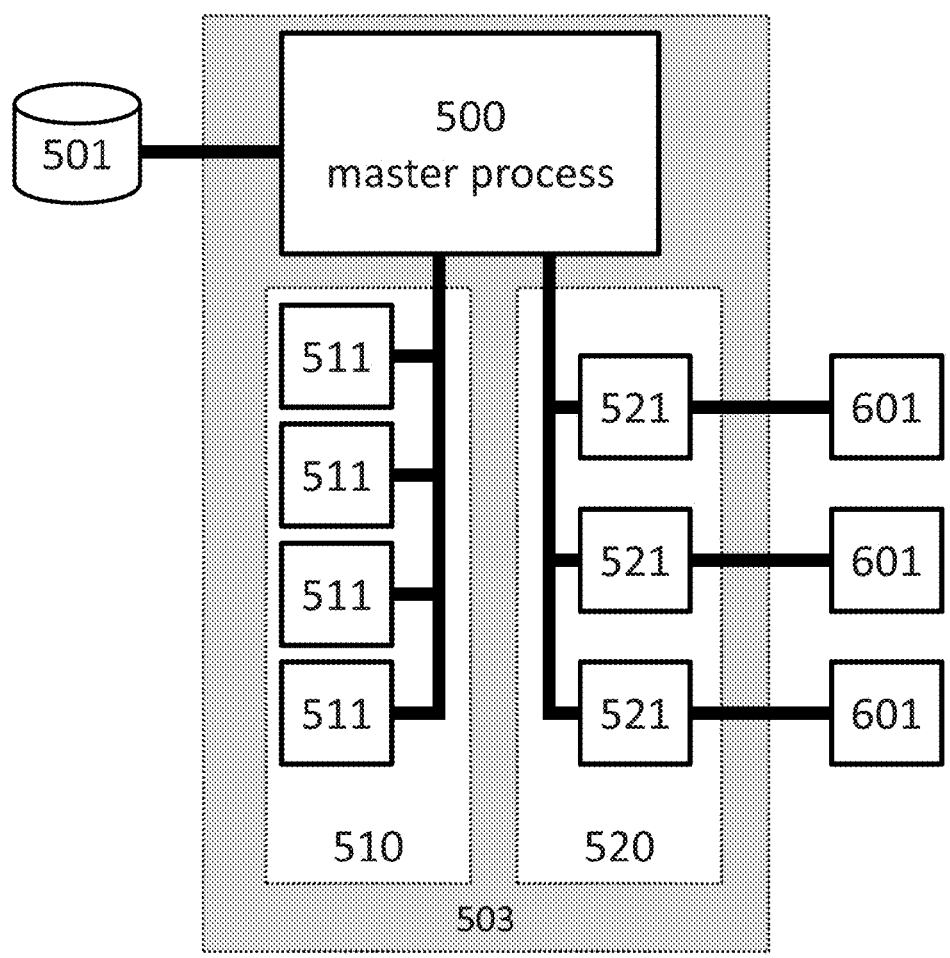
FIG. 4 illustrates a particular part of the computer-implemented method of the present invention. Shown is a flow chart of the portion of the computer-implemented method that is executed by each co-processor.

The computer implementation of the invention presented here employs a parallel programming model, which is illustrated in FIG. 4. This programming model, which encompasses several layers of parallelism, ensures a high efficiency of the application by maximizing the concurrency of individual computational components such as the co-processors 20.

FIG. 4 shows how the programming model is executed by the computational system 100, including the CPU 10 and the co-processors 20.

As shown in FIG. 4, the main "master" process of the application 500 interprets program parameters specified by the user and performs all disk input and output operations in relation to storage device 501 (or similarly, storage device 13 as shown in FIG. 2). The master process 500 also creates two separate groups of subthreads 510 and 520, both of which share the memory address space with the master process 500. The first group of subthreads 510 is employed to compress and decompress the wavefield data snapshots (for example steps 204 and 304 in FIG. 2, respectively), as well as to perform the wavefield convolution used for imaging (for example, step 305 in FIG. 2). The number of individual subthreads 511 created in group 510 may be variable and depends on the amount of compute resources available in the computer system used; typical numbers range from 5-20.

The second group of subthreads 520 is used to control the individual co-processors 601 (or similarly, co-processors 20 as shown in FIG. 2). Each subthread 521 gets assigned exactly one of the co-processors 601 employed and subsequently initiates computations on the associated co-processor, manages all data transfers between the main computer system 10 and the co-processor 601/20 and maintains synchronization between the individual subthreads 521 in the second group 520 as illustrated in FIG. 3

Note, the two groups of subthreads 510 and 520 perform their respective tasks without direct interaction with each other but are synchronized by the master process 500 at certain points of the program flow (1000 in FIG. 2) to ensure the integrity of the data written to and read from disk.

In accordance with the present invention, the RTM application is accelerated by employing Graphics Processing Units (GPU's, graphics cards) as co-processors. A non-limiting advantage of the invention includes significantly reducing processing time for a given "job." As such, improved performance of the RTM algorithm be realized either by processing a larger number of "jobs" in a fixed amount of time or by reducing the turn-around time, i.e. the data-to-decision time. The present invention can also used with other advanced computing applications, such as seismic modeling (which is algorithmically a subset of RTM, but frequently used as a separate tool). Other applications may benefit from individual technical elements of this invention (re-use of code fragments/concepts).

One skilled in the art will appreciate that embodiments of the present invention can be implemented on various co-processor accelerated architectures, such as FPGAs, GPUs, and the Cell chip. The present invention also includes apparatuses, general-purpose computers and/or co-processors programmed with instructions to perform a method for the present invention, as well as computer-readable media encoding instructions to perform a method of the present invention.

Figure 5:
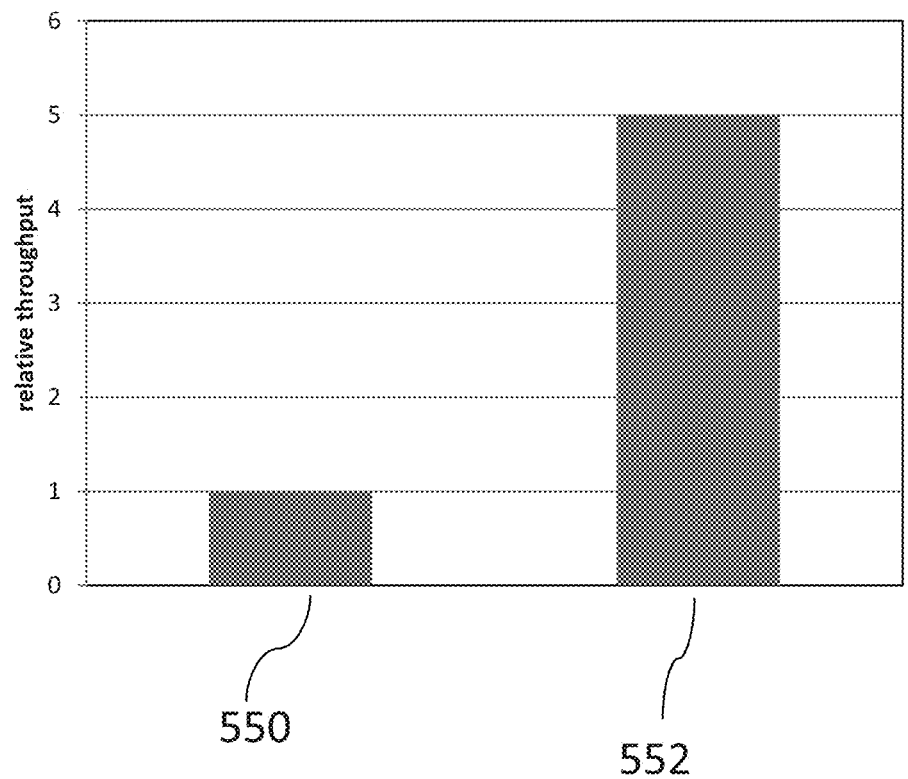
FIG. 5 shows a relative gain in throughout in accordance with the present invention compared to a conventional method.

FIG. 5 illustrates an advantage of the present invention for the RTM algorithm compared to conventional methods. Shown is the throughput 550 and 552 of a typical RTM computation, as performed in production environments, using a conventional method and the method of the present invention, respectively. For purposes of FIG. 5, "throughput" is defined as the size of the data set that is processed divided by the total time it takes to perform the computations; as such, higher throughputs correspond to a more efficient implementation and application of the RTM algorithm as the amount of computing resources and time needed to process a data set of given size is reduced. The 5× improvement 552 of RTM throughput using the present invention was obtained for relevant data set sizes using an equivalent amount of compute resources. For example, a single cluster node with 12 cores was compared to the same node with 12 cores plus 8 GPUs.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A system for generating images related to a subsurface region of interest, comprising:
   a data storage device having seismic data and an earth model related to the subsurface region of interest;
   at least one central processing unit (CPU) in communication with the data storage device, the CPU comprising at least one processing core and associated CPU memory;
   at least one external co-processor in communication with the CPU, the external co-processor comprising at least one external co-processor processing core directly coupled to a corresponding local memory, and wherein the external co-processor processing core comprises computer programmable code for forward propagating a source wavefield using the earth model at a first time interval; transferring, at a second time interval, the forward propagated source wavefield to the CPU for compression and external storage; backward propagating the seismic data at the first time interval to derive backward propagated receiver wavefield; and transferring, at the second time interval, the backward propagated receiver wavefield to the CPU;
   wherein the CPU processing core is programmed to retrieve and decompress the forward propagated source wavefield data and apply imaging conditions to the decompressed forward propagated source wavefield and the backward propagated receiver wavefield to construct image data representative of the subsurface region of interest.

2. The system of claim 1, further comprising a display device in communication with the CPU for displaying the image data representative of the subsurface region of interest.

3. The system of claim 1, further comprising finite difference modeling code for forward and backward propagating of the source and receiver wavefield data.

4. The system of claim 1, further comprising asynchronous communication code for efficient exchange of data between the CPU and the external co-processor.

5. The system of claim 4, wherein the asynchronous communication code comprises ghostpoints.

6. The system of claim 4, wherein the asynchronous communication code comprises wavefield snapshots.

7. The system of claim 1, further comprising 2-pass input/output bound code for implementing a Reverse Time Migration algorithm, realized through asynchronous data input/output and imaging concurrent with computation on co-processors.

8. A computer-implemented method of generating images related to a subsurface region of interest, comprising:
   accessing, via a central processing unit (CPU), seismic data and an earth model related to the subsurface region of interest;
   forward propagating a source wavefield using the earth model at a first time interval via at least one external co-processor coupled to the CPU;
   transferring, at a second time interval, the forward propagated source wavefield to the CPU for compression and external storage;
   backward propagating the seismic data at the first time interval via the external co-processor to derive backward propagated receiver wavefield;
   transferring, at the second time interval, the backward propagated receiver wavefield to the CPU;
   retrieving the stored forward propagated source wavefield;
   decompressing the retrieved forward propagated source wavefield via the CPU; and
   via the CPU, applying imaging conditions to the decompressed forward propagated source wavefield and backward propagated receiver wavefield to construct image data representative of the subsurface region of interest.

9. The method of claim 8, further comprising displaying the image data representative of the subsurface region of interest.

10. The method of claim 8, wherein the forward and backward propagating steps comprise finite difference modeling of the source and receiver wavefield.

11. The method of claim 8, further comprising asynchronously communicating between the CPU and the external co-processor for efficient exchange of data.

12. The method of claim 11, wherein the step of asynchronously communicating between the CPU and the external co-processor comprises using ghostpoints.

13. The method of claim 11, wherein the step of asynchronously communicating between the CPU and the external co-processor comprises using wavefield snapshots.

14. The method of claim 11, further comprising using a 2-pass forward propagation of the source wavefield followed backward propagating the seismic data as part of a Reverse Time Migration algorithm, realized through asynchronous data input/output and imaging concurrent with computation on co-processors.

15. The method of claim 8, further comprising iterating full waveform inversion to utilize gradient information to update subsurface medium properties.

16. A method for propagating seismic wavefields, comprising:
    initiating, via a central processing unit (CPU), a plurality of computational blocks in at least one external co-processor coupled to the CPU for coordinating computational functions related to the wavefield in the external co-processor;
    initiating, via a central processing unit (CPU), a plurality of data transfer blocks in the external co-processor to coordinate data transfer functions related to the wavefield between the CPU and external co-processor;
    controlling the propagating of the wavefield via a central processing unit (CPU) via a CPU subthread; and
    concurrently performing, asynchronously, the computational and data transfer functions via corresponding streams without interfering with the CPU subthread.

17. The method of claim 16, further comprising the step of combining at least two numerical operators in a single computational kernel to be executed by the external co-processor.

18. The method of claim 16, wherein the step of performing the computational and data transfer functions comprises finite difference modeling in respect to wave propagation.

* * * * *